(12) United States Patent
Wei et al.

(10) Patent No.: US 6,569,804 B1
(45) Date of Patent: May 27, 2003

(54) CHROMIUM-FREE FE-BASED CATALYST FOR CO HIGH-TEMPERATURE-SHIFT REACTION AND ITS PREPARATION

(75) Inventors: Kemei Wei, Fuzhou (CN); Qi Zheng, Fuzhou (CN); Jianben Xu, Fuzhou (CN); Xingyi Ling, Fuzhou (CN)

(73) Assignee: National Engineering, Research Center of Chemical Fertilizer Catalyst at FuZhou University, FuZhou (CN)

(*) Notice: Subject to any disclaimer, the term of this patent is extended or adjusted under 35 U.S.C. 154(b) by 196 days.

(21) Appl. No.: 09/670,586

(22) Filed: Sep. 28, 2000

(30) Foreign Application Priority Data

Mar. 29, 2000 (CN) ........................................ 00105435 A

(51) Int. Cl.⁷ .......................... B01J 23/70; B01J 23/74; B01J 23/00; B01J 23/40; B01J 23/42
(52) U.S. Cl. ...................... 502/338; 502/325; 502/326; 502/327; 502/328; 502/332; 502/335; 502/336; 502/337
(58) Field of Search ........................ 502/325, 326, 502/327, 328, 332, 335, 336, 337, 338, 247, 252, 259, 104, 414

(56) References Cited

U.S. PATENT DOCUMENTS

| | | | |
|---|---|---|---|
| 3,686,347 A * | 8/1972 | Dean et al. ............. | 260/680 E |
| 3,872,027 A * | 3/1975 | Christmann et al. ........ | 252/430 |
| 4,234,461 A * | 11/1980 | Suresh et al. ............... | 252/462 |
| 4,235,749 A * | 11/1980 | Gens .......................... | 252/443 |
| 4,256,654 A * | 3/1981 | Schlinger et al. ..... | 260/449.6 R |
| 4,329,517 A * | 5/1982 | Taniguchi et al. .......... | 568/804 |
| 4,912,077 A * | 3/1990 | Lachman et al. ........... | 502/302 |
| 4,968,661 A * | 11/1990 | Teller et al. ................. | 502/304 |
| 5,118,715 A * | 6/1992 | Iglesia et al. ............... | 518/713 |
| 5,418,201 A * | 5/1995 | Roberts et al. ............. | 502/245 |
| 5,543,437 A * | 8/1996 | Benham et al. ............. | 518/700 |
| 6,235,677 B1 * | 5/2001 | Manzer et al. .............. | 502/232 |

FOREIGN PATENT DOCUMENTS

EP           0 174 716          * 3/1986

* cited by examiner

Primary Examiner—Stanley S. Silverman
Assistant Examiner—Cam N. Nguyen
(74) Attorney, Agent, or Firm—Pennie & Edmonds LLP

(57) ABSTRACT

A chromium-free Fe-based catalyst for CO HTS reaction, comprising about 65 to about 90% by weight of Ferriate oxides; about 1 to about 10% by weight of Al, Fe, Si-mixed oxides (Al:Fe:Si=6:2:1) or aluminum-silicon-sol (Al:Si=8:2); about 0.5 to about 2.0% by weight of vanadium oxides; about 0.5 to about 3.0% by weight of magnesium oxides; about 0.5 to about 3.0% by weight of nickel oxides and about 0.1 to about 0.6% by weight of potassium oxide, based on the total weight of the catalyst. There is also provided a method for producing the catalyst.

4 Claims, 2 Drawing Sheets

CHROMIUM-FREE FE-BASED CATALYST FOR CO HIGH-TEMPERATURE-SHIFT REACTION AND ITS PREPARATION

FIELD OF THE INVENTION

The present invention relates to a catalyst used in ammonia synthesis and hydrogen preparation, and the preparation of the same. More particularly, the present invention relates to a chromium-free Fe-based catalyst for CO high-temperature-shift (HTS) reaction, and its preparation.

BACKGROUND OF THE INVENTION

In conventional Fe-Cr-based catalyst for CO HTS reaction, chromium can improve the activity, heat-resistance and life of the catalyst as a main promoter. However, Cr has been proved to be a potent carcinogen, which can bring harmful effect to human health and the environment in the process of preparation, use and disposal of the catalyst. Accordingly, a great of effort has been directed toward the development of chromium-free catalyst for CO HTS reaction in the whole globe.

The followings are the main developments on the catalyst for CO HTS reaction since 1970's.

Soviet Union Ivanov Institution has developed a CTK→KC type Fe-Pb-based catalyst, in which another pollutant, Pb, was involved (with Pb in the range of 10–14% by weight).

ICI Incorporation has developed a 71-1 and a 71-2 type chromium-free catalyst comprising CaO, $CeO_2$ and $ZrO_2$ $(Hf)_2)$. But production process is very complicated, which leads to high cost of the preparation.

Nissan Incorporation has developed a chromium-free catalyst, which is made of $Fe_2O_3$, $Al_2O_3$, CuO, $K_2O$ and Pt.

A patent application entitled "Chromium-free Fe-based catalyst for high(middle)-temperature-shift reaction and its preparation" (filing number: 95121834.4) filed by China Inner Mongolia Polytechnic University disclosed a NBC type chromium-free catalyst prepared by using $Fe_2O_3$, $CeO_2$, $Al_2O_3$, and $K_2O$.

However, the catalysts mentioned above have problems, such as complexity of production process, high cost and introduction of new pollutant, which are required to be solved.

SUMMARY OF THE INVENTION

It is an object of the present invention to provide a novel chromium-free Fe-based catalyst for CO HTS reaction, which can eliminate the pollution of Cr without introducing new pollutant, and which can be produced simply by using the equipment for producing conventional HTS catalyst. The catalyst comprises FeO, Al, Fe, Si-mixed oxides or aluminum-silicon-sol, vanadium oxides, magnesium oxides, nickel oxides and potassium oxides.

It is another object of the present invention to provide a process for producing the catalyst of the present invention.

DETAILED DESCRIPTION OF THE INVENTION

The object of the present invent is fulfilled by a novel chromium-free Fe-based catalyst for CO HTS reaction comprising from about 65 to about 90% by weight of Ferriate Oxides, from about 1 to about 10% by weight of Al, Fe, Si-mixed oxides (Al:Fe:Si=6:2:1) or aluminum-silicon-sol (Al:Si=8:2), from about 0.5 about 2.0% by weight of vanadium oxides, from about 0.5 to about 3.0% by weight of magnesium oxides, from about 0.5 to about 3.0% by weight of nickel oxides, and from about 0.1 to about 0.6% by weight of potassium oxides, based on the total weight of the catalytic material.

The present invention further provides a process for producing the catalyst of the present invention. Firstly, a precursor ferric oxides are obtained by the following process. $FeSO_4 \cdot 7H_2O$ is dissolved in water at 30–50° C., the density of the solution is 1.2–1.35. A $(NH_4)_2CO_3$ solution (the concentration of $(NH_4)_2CO_3$ and $NH_4OH$ is 180 g/L–280 g/L and 20 g/L–100 g/L, respectively) is obtained by adding aqueous ammonia solution in $NH_4HCO_3$ solution. Then, the $FeSO_4$ solution is neutralized with $(NH_4)_2CO_3$ solution until pH is between 6.5–7.5 in about 180 minutes at 65–75° C. The slushy precipitated product is heated at 90–95° C. for 60 minutes, then washed with water at a temperature of 40–60° C. for 4–6 times until no white precipitate is produced by adding 10% $BaCl_2$ solution to the water after washing. The final product, i.e. the catalyst of the present invention, is obtained by one of the two methods listed below.

Method 1: All the ingredients except $K_2O$ with the amount indicated above are beaten for 30 minutes, followed by pressure-filtering and drying. Then KOH as the precursor of $K_2O$ is added. The mixture thus obtained is milled for 60 minutes, followed by graining, and calcining at 300–350° C. for 90–120 minutes. Then 0.5%–1.0% graphite is added. The final product is obtained by pelleting the mixture.

Method 2: The slushy precipitated product as obtained above is pressure-filtered and dried, followed by adding all other ingredients with the amount as indicated. Then the mixture is milled for one hour. After that, the mixture is grained, and calcined at 300–350° C. for 90–120 minutes. Thereafter, 0.5%–1.0% graphite is added. The final product is obtained by pelleting the mixture.

Upon extensive investigation, the inventors of the present invention are aware that Cr plays a role not only as the structure promoter but also as the electron promoter. Based on this, Al, Fe, Si-mixed oxides (aluminum-silicon-sol) were prepared and these elements were entered into the lattice of $Fe_3O_4$, resulting the decrease of the size of the crystallite, increase of the surface area, and substitution for Cr to act as the structure promoter. It was proved by XRD and Mössbauer spectra that vanadium added in the form of vanadium oxides exists as $V^{4+}$ in A site of the lattice of spinel $Fe_3O_4$ in the reaction system. It was also found that nickel oxides added thereto can increase the density of $OH^-$ on the surface of the catalyst, thereby improving the activity and anti-sulfur performance of the catalyst under low stream and gas ratio (ac. 1.85) conditions. Thereby, the performance of the chromium-free Fe-based catalyst of the present invention reached the level of traditional Fe-Cr-based catalyst.

EXAMPLES

Example 1

Figure 1:
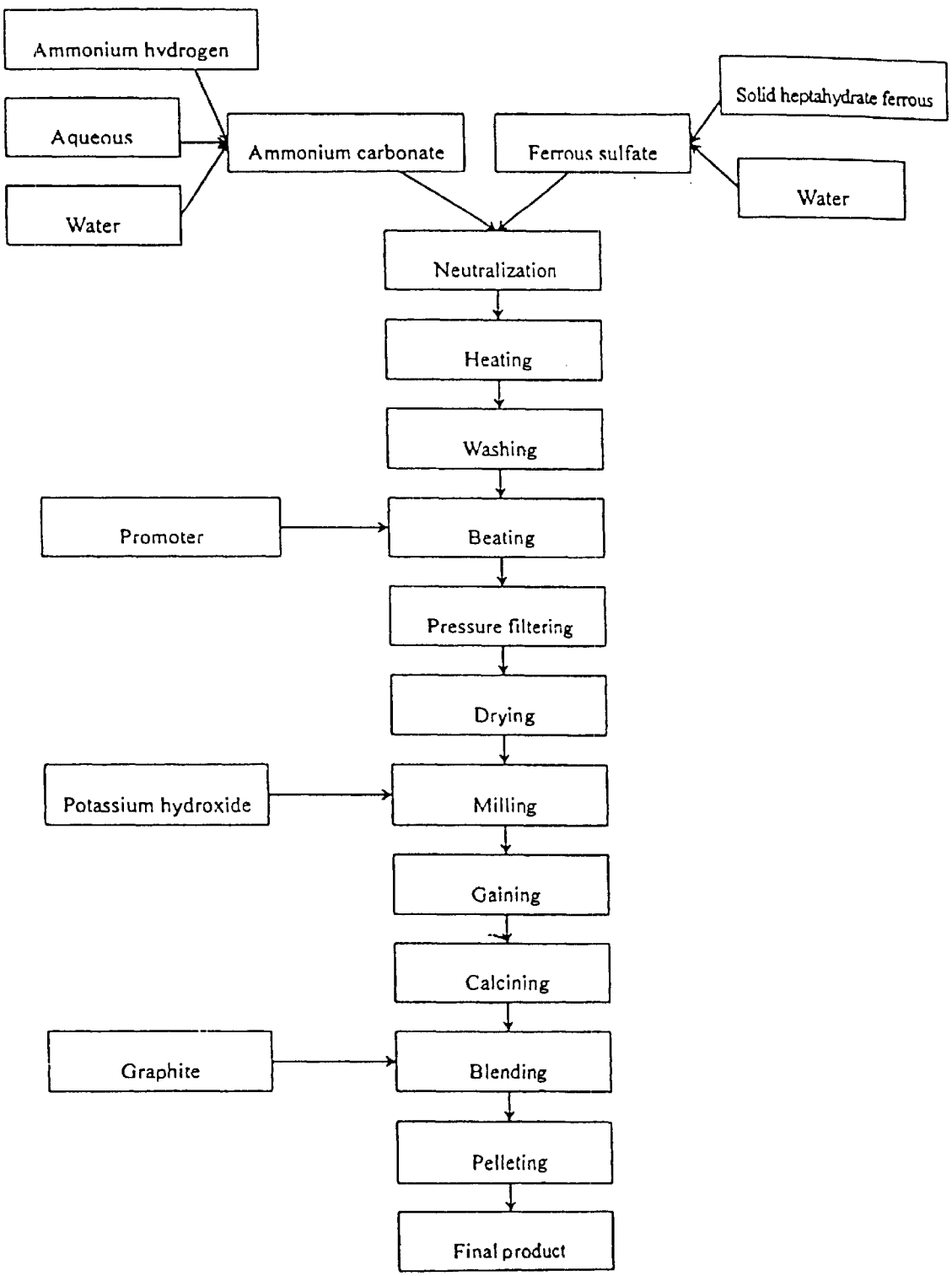
FIG. 1 shows the process of method 1 of the present invention. Firstly, $FeSO_4 \cdot 7H_2O$ is dissolved and $(NH_4)_2CO_3$ is produced from $NH_4HCO_3$ solution by the addition of aqueous ammonia. After that, $FeSO_4$ solution is neutralized by $(NH_4)_2CO_3$ solution in a co-current way. Then the slushy precipitated product is heated and washed. Then all the ingredients except $K_2O$ with the amount as indicated are beaten, pressure-filtered and dried. Thereafter, KOH as the precursor of $K_2O$ is added. The mixture thus obtained is milled for 60 minutes, followed by graining, calcining, and blending with graphite. Final product is obtained by pelleting the mixture.
Figure 2:
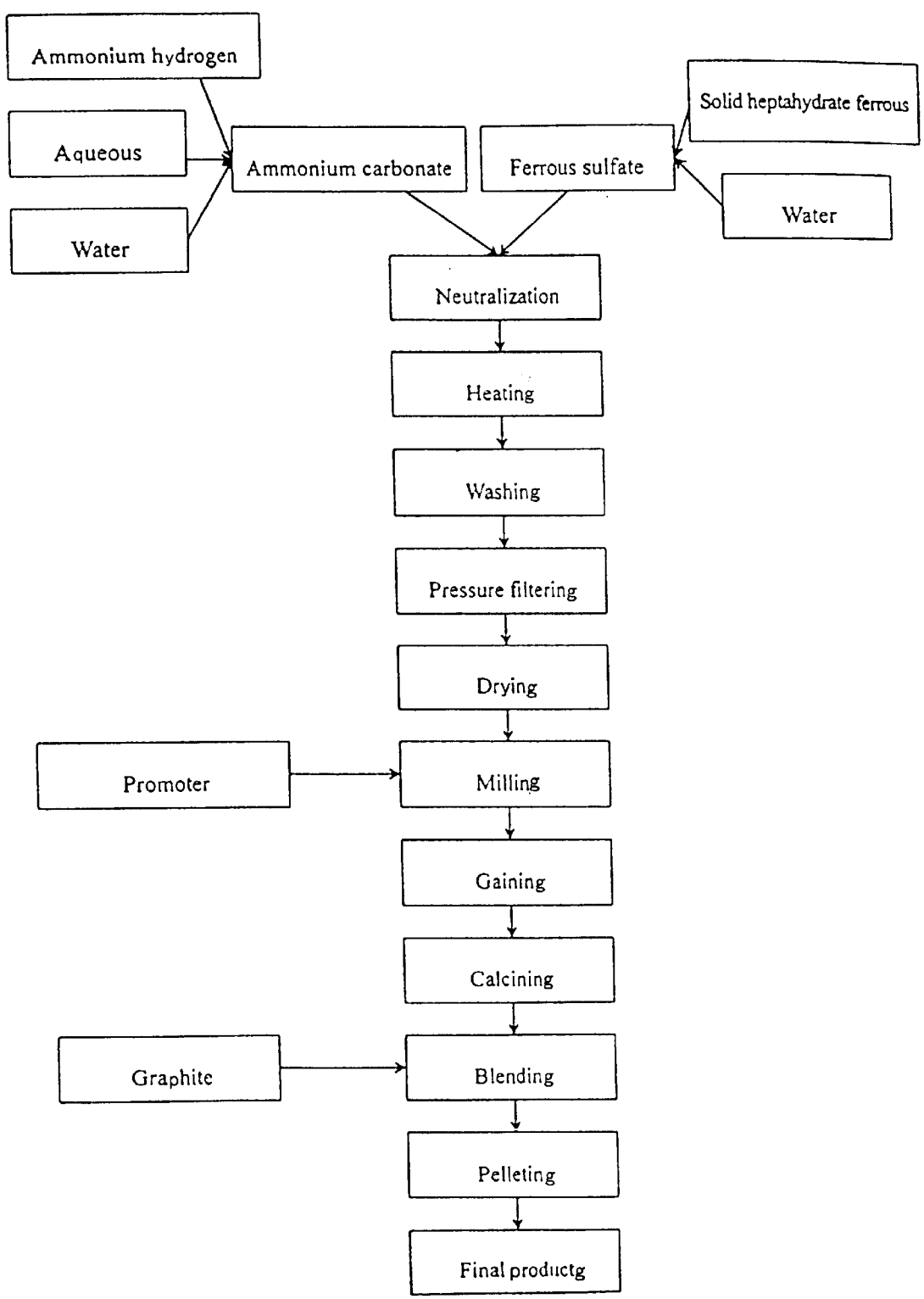
FIG. 2 shows the process of method 2 of the present invention. Firstly, $FeSO_4 \cdot 7H_2O$ is dissolved and $(NH_4)_2CO_3$ is produced from $NH_4HCO_3$ solution by the addition of aqueous ammonia. After that, $FeSO_4$ solution is neutralized with $(NH_4)_2CO_3$ solution in a co-current way. Thereafter, the slushy precipitated product is heated, washed, pressure-filtered and dried. Then, all the other ingredients are added with the amount as indicated. The mixture is milled, grained and calcined, and graphite is added. The final product is obtained by pelleting the mixture.

To produce 1,000 kilo of the catalyst, the materials that are needed includes 3,100 kilo of 90% $FeSO_4 \cdot 7H_2O$, 1,200 kilo of $NH_4HCO_3$, 200 kilo of aqueous ammonia, 60 kilo of the Al,Fe,Si-mixed oxides, 15 kilo of vanadium oxides, 20 kilo of magnesium oxides, 45 kilo of nickel oxides, 5 kilo of potassium hydroxide and 8 kilo of graphite.

Firstly, $FeSO_4 \cdot 7H_2O$ was dissolved in water at 30–50° C., the density of the solution is 1.2–1.35. $(NH_4)_2CO_3$ solution (the concentrate of $(NH_4)_2CO_3$ and $NH_4OH$ is 180 g/L–280 g/L and 20 g/L–100 g/L, respectively) was obtained by adding aqueous ammonia solution in $NH_4HCO_3$ solution. When the temperature of water in the reactor reached to 60° C., $FeSO_4$ solution was neutralized with $(NH_4)_2CO_3$ solution in accelerated co-current way until pH was in the range of 6.5–7.5. In this process, the temperature was controlled at 65–75° C. This process takes about 180 minutes. At 30 minutes before the end of the reaction, the solution was acidified to control pH at 6.5 for 15 minutes, then a base was added to control pH at 7.2 for 15 minutes. The slushy precipitated product was heated at 90–95° C. for 60 min, then washed with water at the temperature of 40–60° C. for 4–6 times until no white precipitate is produced by adding 10% $BaCl_2$ solution to the water after wash. The precursor ferric oxide was thus obtained.

Then all the other ingredients except $K_2O$ with the amount indicated above were beaten with the precipitate for 30 min, followed by pressure-filtering and drying. Then KOH as the precursor of $K_2O$ was added. The mixture thus obtained was milled for 60 min, followed by graining, and calcining at 300–350° C. for 90–120 minutes Then 0.5%–1.0% graphite was added. A product in the form of column ($\phi$9 mm×6–8 mm) was obtained by pelleting the mixture.

The product was evaluated according to the Standard ZBG74001-89. The conversion of CO is 55.7% after the catalyst suffering heat treatment. The radial anti-pressure strength is 275N/cm; the low strength percentage is 2.5%; the abrasion percentage is 3.6%; and the lose weight percentage is 2.5% after calcined at 600° C. for 2 hours.

Example 2

A precursor ferric oxide was obtained by the same procedure as example 1. The slushy precipitated product thus obtained was pressure-filtered and dried, followed by adding all other ingredients with the amount as indicated. Then the mixture was milled for one hour. After that, the mixture was grained, and calcined at 300–350° C. for 90–120 minutes.

The 0.5%–1.0% graphite was added. The final product was obtained by pelleting the mixture.

The product was evaluated according to the Standard ZBG74001-89. The conversion of CO is 52.3% after the catalyst suffering heat treatment. The radial anti-pressure strength is 325N/cm; the low strength percentage is 0%; the abrasion percentage is 3.3%; and the lose weight percentage is 5.1% after calcined at 600° C. for 2 hours.

It has been proved that this product has excellent performances and the life time in industry is more than 3 year.

Example 3

To produce 1,000 kilo of the catalyst, the materials that are needed includes 3,100 kilo of 90% $FeSO_4 \cdot 7H_2O$, 1,200 kilo of $NH_4HCO_3$, 200 kilo of aqueous ammonia, 100 kilo of aluminum-silicon-sol (w(SiAl)%=40, Si:Al=2:8), 15 kilo of vanadium oxides, 20 kilo of magnesium oxides, 45 kilo of nickel oxides, 5 kilo of potassium hydroxide and 8 kilo of graphite.

A Final product was obtained by the same method as mentioned in example 2. The product was evaluated according to the Standard ZBG74001-89. The conversion of CO is 49.3% after the catalyst suffering heat treatment. The radial anti-pressure strength is 360N/cm; the low strength percentage is 0%; the abrasion percentage is 4.5%; and the lose weight percentage is 6.1% after calcined at 600° C. for 2 hours.

We claim:

1. A chromium-free Fe-based catalyst for CO HTS reaction, comprising about 65 to about 90% by weight of Ferriate oxides; about 1 to about 10% by weight of Al, Fe, Si-mixed oxides (Al:Fe:Si=6:2:1) or aluminum-silicon-sol (Al:Si=8:2); about 0.5 to about 2.0% by weight of vanadium oxides; about 0.5% to about 3.0% by weight of magnesium oxides; about 0.5 to about 3.0% by weight of nickel oxides and about 0.1 to about 0.6% by weight of potassium oxide, based on the total weight of the catalyst.

2. A method for producing the chromium-free Fe-based catalyst for CO HTS reaction of claim 1, comprising the steps of:

dissolving $FeSO_4 \cdot H_2O$ in water at 30–50° C. to form a $FeSO_4$ solution, and making the density of the $FeSO_4$ solution at 1.2–1.35;

dissolving $NH_4HCO_3$ in water, and adding $NH_4OH$ solution to obtain a $(NH_4)_2CO_3$ solution;

neutralizing the $FeSO_4$ solution with the $(NH_4)_2CO_3$ solution, then obtaining a slushy precipitated product;

heating the slushy precipitated product at 90–95° C. for 60 minutes, and washing the resulting precipitate with water at a temperature of 40–60° C. for 4–6 times until $BaSO_4$ precipitate is no longer detected in the effluent by the dropwise addition of 10% $BaCl_2$ solution.

3. A method according to claim 2, wherein the concentrate of $(NH_4)_2CO_3$ and $NH_4OH$ in the $(NH_4)_2CO_3$ solution is 180 g/L–280 g/L and 20 g/L–100 g/L, respectively.

4. A method according to claim 2, wherein neutralizing the $FeSO_4$ solution with the $(NH_4)_2CO_3$ solution is performed at 65075° C. to a pH in the range of 6.5 to 7.5 in about 180 minutes.

\* \* \* \* \*